(12) United States Patent
Hensley

(10) Patent No.: US 8,369,445 B2
(45) Date of Patent: Feb. 5, 2013

(54) SYSTEM AND METHOD FOR IMPROVED COMMUNICATION UTILIZING VELOCITY RELATED INFORMATION

(75) Inventor: Marion P. Hensley, Pendleton, IN (US)

(73) Assignee: Raytheon Company, Waltham, MA (US)

( * ) Notice: Subject to any disclaimer, the term of this patent is extended or adjusted under 35 U.S.C. 154(b) by 701 days.

(21) Appl. No.: 12/328,316

(22) Filed: Dec. 4, 2008

(65) Prior Publication Data

US 2010/0142646 A1 Jun. 10, 2010

(51) Int. Cl.
*H04L 27/00* (2006.01)
(52) U.S. Cl. ........ 375/295; 375/316; 375/219; 342/352; 342/354; 342/353; 342/175; 455/71
(58) Field of Classification Search .................. 375/295, 375/316, 219; 342/352, 354, 353, 175; 455/12, 455/13, 63, 71
See application file for complete search history.

(56) References Cited

U.S. PATENT DOCUMENTS

| | | | |
|---|---|---|---|
| 5,703,595 A * | 12/1997 | Tayloe et al. | 342/175 |
| 5,874,913 A * | 2/1999 | Blanchard et al. | 342/352 |
| 5,917,444 A * | 6/1999 | Loomis et al. | 342/357.75 |
| 6,532,432 B1 | 3/2003 | Nagatsuma et al. | |
| 2005/0272379 A1* | 12/2005 | Rotta et al. | 455/67.16 |

FOREIGN PATENT DOCUMENTS

| | | |
|---|---|---|
| EP | 1 096 698 A | 5/2001 |
| EP | 1 096 698 A2 | 5/2001 |
| JP | 2002 261677 | 9/2002 |
| JP | 2002 261677 A | 9/2002 |

OTHER PUBLICATIONS

Boppana, Deepak, "FPGA-Based WiMAX System Design", CP-WIMAX-1.0, Copyright © 2005, Altera Corporation, 7 pages, 2005.
IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, Annex H to Amendment 2 and Corrigendum 1 to IEEE Std 802.16-2004, IEEE Std 802.16e-2005, IEEE Std 802.16-2004/Cor 1-2005, cover and pp. 819-822, Feb. 28, 2006.
Li, Kuo-Hui, "IEEE 802.16e-2005 Air Interface Overview", Intel Mobility Group, WiMAX Solutions Division, 91 pages, Jun. 5, 2006.
Notification of Transmittal of the International Search Report and the Written Opinion of the International Searching Authority or the Declaration, International Application No. PCT/US2009/064084, 12 pages, dated Jan. 27, 2010.
International Search Report of the ISA for PCT/US2009/064084 dated Jan. 27, 2010.

\* cited by examiner

*Primary Examiner* — Zewdu Kassa
(74) *Attorney, Agent, or Firm* — Daly, Crowley, Mofford & Durkee, LLP

(57) ABSTRACT

According to one embodiment, a method for communication includes receiving, by a receiver, a first modulated signal. The first modulated signal includes at least one error. The method also includes demodulating the first modulated signal. The demodulation includes compensating for the at least one error utilizing information related to a velocity of the receiver.

24 Claims, 2 Drawing Sheets

US 8,369,445 B2

SYSTEM AND METHOD FOR IMPROVED COMMUNICATION UTILIZING VELOCITY RELATED INFORMATION

TECHNICAL FIELD OF THE INVENTION

This invention relates generally to communication and more particularly to a system and method for improved communication utilizing velocity related information.

BACKGROUND OF THE INVENTION

Effective data communication in diverse environments has proven useful in many contexts. For example, being able to establish reliable communication sessions in military scenarios may lead to a higher rate of success in missions while also saving lives. In another example, persistent data connections in the consumer and business atmospheres lead to increased potential and productivity. Many communications schemes, however, suffer from errors introduced by the velocity of at least one of the nodes communicating in a session. For example, Doppler shift may affect a received signal such that significant interference or data corruption occurs. Communication schemes susceptible to velocity-based errors include, among others, Orthogonal Frequency-Division Multiplexing (OFDM) and Orthogonal Frequency-Division Multiple Access (OFDMA). Further, planned widespread deployment of communication schemes such as WiMax and LTE may also suffer from similar errors.

SUMMARY OF THE INVENTION

According to one embodiment, a method for communication includes receiving, by a receiver, a first modulated signal. The first modulated signal includes at least one error. The method also includes demodulating the first modulated signal. The demodulation includes compensating for the at least one error utilizing information related to a velocity of the receiver.

The information related to the velocity of the receiver may include the velocity of the receiver or the velocity of a transmitter that transmits the first modulated signal, and/or a relative velocity vector. The at least one error may include Doppler shift.

According to one embodiment, a system for communication includes a node operable to receive a first modulated signal comprising at least one error. The node is also operable to demodulate the first modulated signal. The demodulation includes compensating for the at least one error utilizing information related to a velocity of the node.

Depending on the specific features implemented, particular embodiments may exhibit some, none, or all of the following technical advantages. Compensating for velocity-based error may allow for data communication using certain encoding schemes or protocols in environments that were otherwise not possible. For example, nodes may be enabled to communicate using high data rate algorithms although one or more of the nodes is traveling at a substantial velocity. Further, communication in such environments may be enabled even when direct information regarding velocity of the communicating nodes is not available. This may lead to robust communication sessions. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts, and which.

DETAILED DESCRIPTION OF THE INVENTION

Figure 1A:
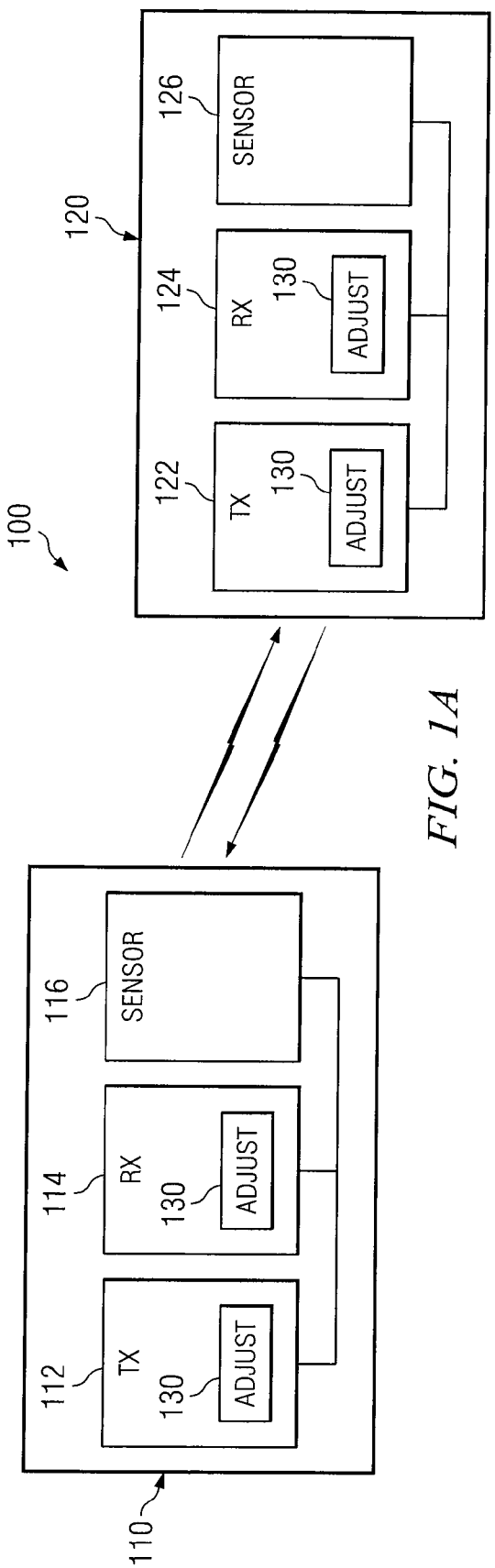
FIG. 1A illustrates one embodiment of a system for communication that compensates for velocity-based error.

FIG. 1A illustrates one embodiment of a system 100 for communication that compensates for velocity-based error. System 100 includes a mobile node 110, which may move, and a station 120, which is generally stationary. Mobile node 110 and station 120 may communicate. In this example, mobile node 110 communicates with station 120 by using transmitter 112 and receiver 114 located on mobile node 110 and transmitter 122 and receiver 124 located on station 120. This communication may be susceptible to error due to the relative velocity between mobile node 110 and station 120. In various embodiments, velocity-based errors experienced in the communication session between mobile node 110 and station 120 may be caused by Doppler shift. Doppler shift refers to the phenomenon of an electromagnetic wave being received differently based upon the relative velocity of the receiver compared to the transmitter. This can create an error, referred to as "Doppler error" by causing interference between channels or subchannels present in a signal.

As discussed further below, the teachings of the disclosure provide an approach for addressing this problem. In one example, transmitters 112 and 122 may transmit velocity vectors for mobile node 110 and station 122, respectively, to station 122 and mobile 110, respectively. Position information may also be transmitted. Velocity vectors may be generated by sensor 116 and sensor 126, located on mobile node 110 and station 120, respectively. Alternatively, velocity vectors may be generated by other devices, including those not located on mobile node 110 or station 120. Receivers 114 and 124 may utilize the transmitted velocity vectors to compensate for the velocity-based error in the received signals through adjust modules 130 and achieve a communication session with a better data rate, as further discussed below. In various embodiments, mobile node 110 and/or station 120 may compensate for velocity-based error during transmission using adjust modules 130 located in transmitters 112 and 114. In some embodiments, both mobile node 110 and station 120 are in motion, which may also introduce error into their communication session. In some embodiments, more than two nodes similarly equipped as mobile node 110 and/or station 120 may also participate in the communication session and compensate for velocity-based error. In some embodiments, this may be advantageous in that mobile node 110 and station 120 may maintain robust communication sessions although either mobile node 110 and/or station 120 may be in motion at substantial velocity.

Mobile node 110 and station 120, in some embodiments, may each be stationary or in motion. For example, mobile node 110 may be an aircraft communicating digitally with a base station providing data communication services. Mobile node 110 may also be any other suitable vehicle, such as a watercraft or a terrestrial vehicle like a train. In some embodiments, mobile node 110 and station 120 may communicate using a protocol susceptible to velocity-based error. Such protocols may include using OFDM or OFDMA technology, in which the transmission of data on sub-channels may experience interference or corruption as a result of velocity-based error such as Doppler shift. Mobile node 110 and station 120, in some examples, may utilize WiMax or Long Term Evolution (LTE) communication sessions. Mobile node 110 and station 120 may also utilize the IEEE 802.16(e) specification as part of the communication session. Other protocols may also be used.

Transmitters 112 and 122 as well as receivers 114 and 124 may, in some embodiments, include memory and processing elements as well as dedicated circuits. The memory and processing elements may be provided in a single package or as separate modules.

Processing elements may include one or more processors. Processing elements may include embedded processing architectures. Cell-based architectures may also be suitable. Processing elements may include utilizing a Pentium processor from the Intel Corporation. Other processors may be utilized without departing from the scope of the disclosure.

Memory elements may include files, stacks, databases, or other suitable forms of data. Memory elements may be random access memory, read-only memory, CD-ROM, removable memory devices or other suitable devices that allow storage and/or retrieval of data.

Sensor 116 and sensor 126, in some embodiments, may include at least the functionality to provide velocity vector information. Sensor 116 and sensor 126 may also include functionality other than providing velocity information. Sensor 116 and sensor 126 may include an array of distributed sensors. Sensor 116 and sensor 126 may include using Global Positioning System (GPS) technology. Other examples include satellite information, aircraft navigational aids, inertial navigation equipment, magnetometers, accelerometers, Global Navigation Satellite System (GLONASS). Any other types of sensors may be utilized which are suitable for providing velocity information.

Figure 1B:
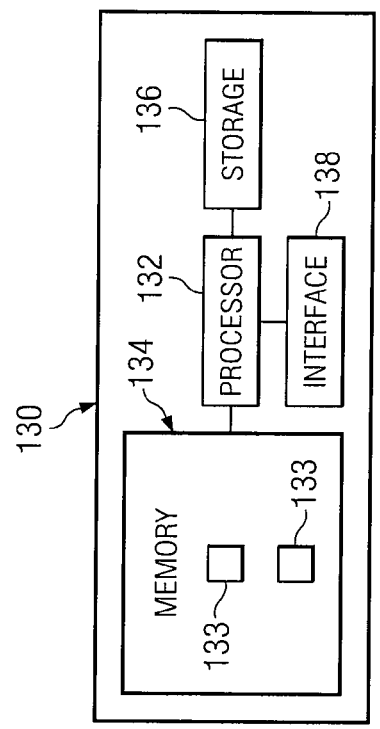
FIG. 1B illustrates one embodiment of an adjust module of FIG. 1A.

FIG. 1B illustrates one embodiment of adjust module 130 of FIG. 1A. In some embodiments, adjust module 130 may include processor 132 which is coupled to memory 134 and storage 136 as well as interface 138. Adjust module 130 may receive information related to velocity through interface 138 and utilize one or more program modules 133 within memory 134 to generate velocity vectors. Program modules 133 may also contain software which may adjust or distort signals in order to compensate for velocity-based error. Further, storage 136 may be utilized by adjust module 130 for any suitable purpose, such as maintaining a history of velocity information.

Processor 132 may include one or more processors. They may include embedded processing architectures. Cell-based architectures may also be suitable. Processing elements may include utilizing a Pentium processor from the Intel Corporation. Other processors may be utilized without departing from the scope of the disclosure.

Memory 134 and storage 136 may include files, stacks, databases, or other suitable forms of data. Memory 134 and storage 136 may be random access memory, read-only memory, CD-ROM, removable memory devices or other suitable devices that allow storage and/or retrieval of data. Memory 134 and storage 136 may be interchangeable and may perform the same functions. However, in the below examples, memory 134 will be used for storage and retrieval of data conventionally stored in random access memory, and storage 136 will perform the functions associated with data conventionally stored in read-only memory.

Figure 2:
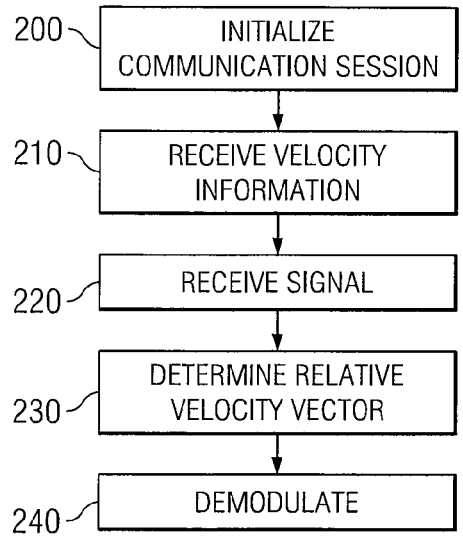
FIG. 2 is a flowchart illustrating one embodiment of the operation of the system illustrated in FIG. 1.

FIG. 2 is a flowchart illustrating one embodiment of a method of communicating which compensates for velocity-based error. In general, the steps illustrated in FIG. 2 may be combined, modified, or deleted where appropriate, and additional steps may also be added to the example operation. Furthermore, the described steps may be performed in any suitable order.

At step 200, in some embodiments, a communication session may be initialized between at least two nodes, such as mobile node 110 and station 120 of FIG. 1. The initialization may be accomplished utilizing transmitters and receivers, such as transmitters 112 and 122 and receivers 114 and 124, located at the nodes. In various embodiments, the transmitters and receivers may be configured with modules to accomplish the initialization, such as adjust module 130. Step 200 may include at least one node in the communication session requesting that the communication session proceed in a manner that compensates for velocity-based error. In some embodiments, the nodes in the communication session may determine that velocity vector information will be regularly sent amongst the nodes, as described further below. Further, the nodes may determine that compensation for velocity-based error may only be applied according to agreed upon thresholds. For example, it may be determined at step 200 that compensation for velocity-based error will occur if a relative velocity vector exceeds 70 miles per hour. Other thresholds may include data rates and other suitable criteria. Time windows may also be used as a threshold such that if a communication session occurs during a particular time, velocity-based error compensation may not occur. In various embodiments, it may be determined that if the conditions for a particular threshold are not met, the nodes in the communication session will not apply compensation for velocity-based errors. This may be advantageous in that compensation may occur only when it is substantially beneficial.

In some embodiments, step 200 may occur while at least one node involved in the communication session is in motion. As a result, communication occurring during step 200 may itself be susceptible to velocity-based error. In some examples, this may be addressed by the nodes involved in the communication session communicating during step 200 on a different channel. For example, a low data rate channel (in which data may be transmitted without significant corruption due to velocity-based error) may be established between the nodes in the communication session which may be utilized for the communication occurring during step 200. In various embodiments, some transmissions during step 200 may be repeatedly sent, with some of these transmissions pre-distorted to account for velocity-based error; the received messages may then be comprehended despite the velocity-based error. For example, the pre-distortions may be based on a prediction of the velocity-based error that may be introduced in the transmitted signal. In some examples, the distortions may be incrementally applied to each transmission such that certain transmissions are distorted differently than other transmissions, though each of the transmission may include similar messages. In some situations, communication during step 200 may be accomplished using a traffic-cop style communication scheme. For example, mobile node 110 may initialize a communication session with station 120 by first communicating with a third node. The third node may contact station 120 and facilitate initializing the communication session between the mobile node 110 and station 120 by, for example, indicating that transmission from mobile node 110 should be processed in a manner that accounts for velocity-based error. The third node may also provide velocity information and may also transmit messages from station 120 to mobile node 110 in order to facilitate initializing the communication session. The techniques described here serve only as examples and other suitable techniques may be utilized at step 200.

At step 210, in some embodiments, a node participating in the communication session may receive velocity information from another node. For example, mobile node 110 may transmit velocity information from sensor 116 to station 120. The velocity information may include position information. The rate at which velocity information is communicated during a communication session may vary depending upon various factors, including the rate of change in velocity, the amount of error introduced due to velocity, the protocol used in the communication session, the type of transmission used in the communication session, etc. For example, velocity information may be transmitted before every data transmission. In some example situations, velocity information may be transmitted only when there is a substantial change in velocity of one of the nodes. In various situations, velocity information may be transmitted based upon the passage of time, such as twice every second. The description above merely consists of examples, and other suitable methods are contemplated for receiving velocity information, such as transmitting velocity information within data transmissions like those contemplated in step 220.

At step 220, in some embodiments, data may be received which may be susceptible to velocity-based errors. Step 220 may occur before step 210 in some examples. As further described below, velocity information may be used to compensate for the velocity based errors in the data received at step 220. This velocity information may be received and applied after step 220 or it may be received before step 220 (as the illustrated embodiment indicates). If step 220 occurs before step 210, the received data may be stored using memory modules, such as those described above with respect to receivers 114 and 124 as well as transmitters 112 and 122. For example, storage 136 may be utilized store the information related to velocity. After the velocity information is received, the received data may then be processed as described below.

At step 230, in some embodiments, a relative velocity vector is calculated. As an example only, adjust module 130 may utilize a program module 133 and processor 132 to determine the relative velocity vector. The relative velocity vector may indicate the velocity of the transmitter of the received signal, such as the data received at step 220, from the perspective of the node which received the signal. This may be based upon the velocity information received at step 210. In some examples, multiple nodes in the communication session may be in motion. As a result, the velocity information which may have been received at step 210 may be combined with velocity information of the node which may have received the data at step 220 to form a relative velocity vector. In various embodiments, only one node may be in motion such that it may only require the received velocity information to determine the relative velocity vector at step 230.

In some embodiments, the relative velocity vector may be calculated without utilizing the information received at step 210. For example, predictive methods may be used to ascertain velocity information utilized in this and other steps to address velocity-based errors. In some embodiments, the predictive methods may be iterative such that the velocity information may be modified as error compensation improves. In some embodiments, databases such as those found in storage 136 may be utilized in combination with programs, such as those stored in program modules 133, to accomplish the predictive methods described here. In addition, statistical techniques can also be applied to predict velocity-based error based on expected statistical or historical error distributions. In various embodiments, this may be advantageous in that compensation for velocity-based error may be achieved even where velocity information cannot be directly measured.

At step 240, in some embodiments, the signal received at step 220 may be demodulated in a manner that incorporates the relative velocity vector determined at step 230. For example, the relative velocity vector may be used to determine the velocity-based error (such as Doppler shift) introduced into the received signal. Knowing this information, the received signal may be distorted in a manner that counteracts, at least in part, the effects of velocity-based error. After this distortion, the received signal may be processed according to the protocol and transmission type utilized in the communication session. For example, receiver 124 may process a received signal by utilizing adjust module 130. Receiver 124 may accomplish certain steps of demodulating the received signal without utilizing adjust module 130 (such as analog to digital conversion); however, during other steps of demodulation, adjust module 130 may utilize information related to velocity and process the received signal in a manner that compensates for velocity-based error. In some embodiments, such as those using OFDM or OFDMA like WiMax and LTE, the received signal may pass through a decimation module as well as a timing and frequency correction module before the velocity information is utilized. In this example, the velocity information may be utilized while computing the Fast Fourier Transform (FFT) of the received signal in order to compensate for velocity-based errors. The received signal may then be processed utilizing conventional demodulation techniques, such as applying a symbol de-mapping module(s), decoding module(s), etc. In various embodiments, step 230 may not be performed as the relative velocity vector may not be needed as long as velocity information is otherwise available. The velocity vector information may be utilized in a manner similar to the relative velocity vector to achieve compensation for velocity-based error in the received signal.

While step 240 is described from the perspective of a receiver, in some embodiments velocity-based error may be compensated for at a transmitter. Utilizing the information garnered in steps 200 and 210, the transmitter may distort the outgoing signal in order to compensate for velocity-based error. For example, transmitter 112 may receive information for transmission from other components of mobile node 110. Adjust module 130 may be utilized by transmitter 112 to manipulate the information for transmission while it is being processed for transmission. Then, transmitter 112 may transmit the information. This may occur while the signal is being modulated for transmission. For example, in an OFDMA communication scheme, modulation may occur after the data to be transmitted has been processed, such as through encoding. The received velocity information may be utilized to ascertain transmission errors such as Doppler shift. The processed data may be distorted during the modulation process to account for velocity-based errors, such as Doppler shift. After this, the modulated signal is then processed as is customary in the communication scheme adopted.

Figure 3:
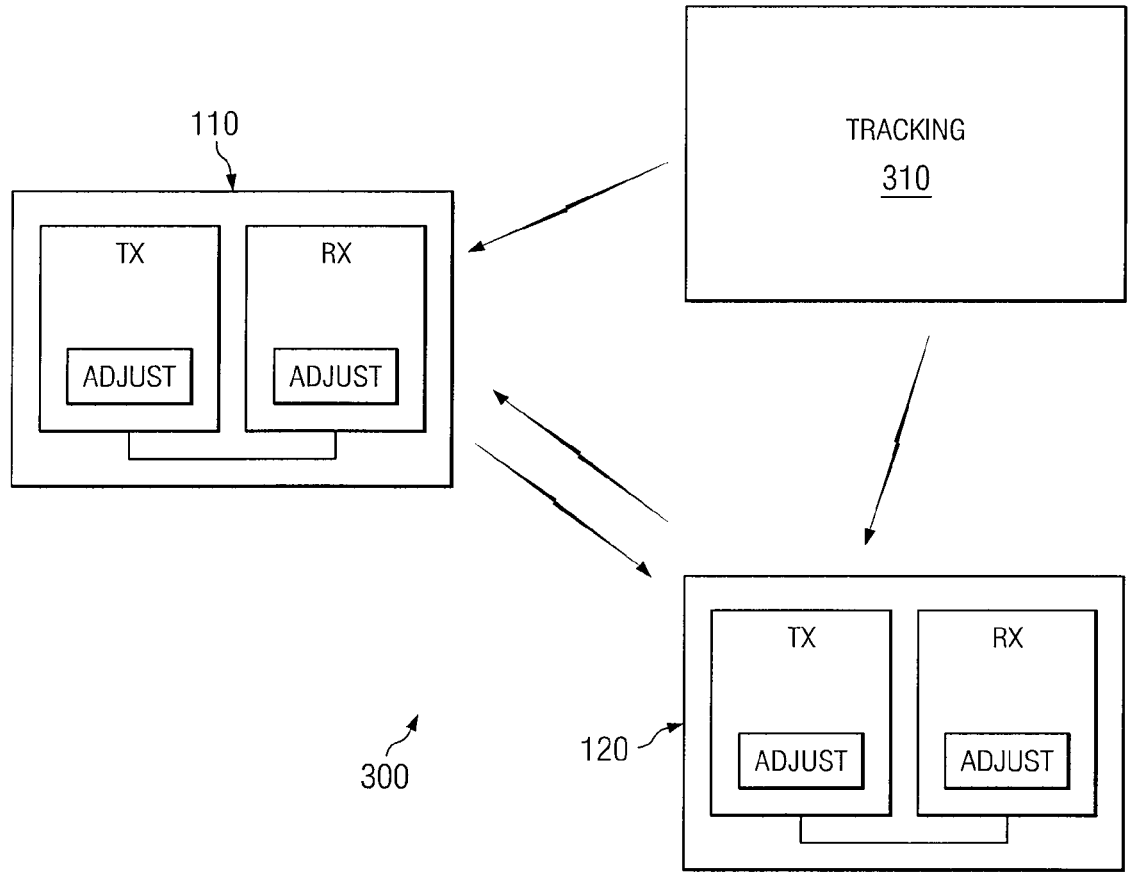
FIG. 3 illustrates another embodiment of a communication system that compensates for velocity-based error.

FIG. 3 illustrates another embodiment of a communication system 300 that compensates for velocity-based errors and that involves a tracking device 310. As described above, mobile node 110 and station 120 communicate in a manner that is susceptible to error based upon the motion of mobile node 110 and/or station 120. Tracking device 310 is utilized to provide velocity information to mobile node 110 and station 120. The velocity information provided by tracking device 310 may supplement or supplant velocity information transmitted by mobile node 110 and station 120. For example, mobile node 110 and station 120 may not transmit any velocity information to one another since tracking device 310 provides sufficient velocity information to perform compensation of velocity-based errors. In some embodiments, more than two nodes similarly equipped as mobile node 110 and/or station 120 may also participate in the communication session and compensate for velocity-based error.

Tracking device 310, in some embodiments, may include radar-based, sonar-based, and/or GPS-based systems. These and other systems may be used alone or in combination to monitor at least velocity information of nodes such as mobile node 110 and station 120. These and other systems may be combined with any suitable memory and processing elements in order to monitor and transmit the velocity information. The processing and memory elements may be similar to those used in transmitters 112 and 122 as well as receivers 114 and 124 as described above. In some embodiments, tracking device 310 may receive information generated by navigational equipment onboard mobile 110, station 120, and/or other nodes to determine velocity information.

Figure 4:
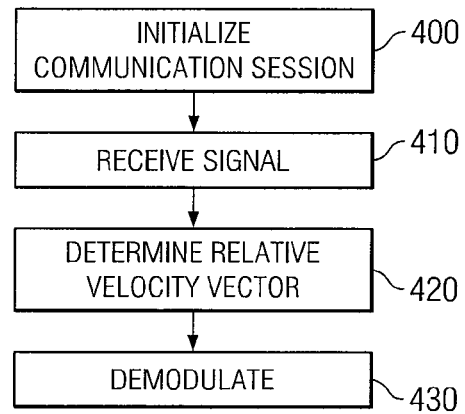
FIG. 4 is a flowchart illustrating one embodiment of the operation of the system illustrated in FIG. 3.

FIG. 4 is a flowchart illustrating one embodiment of the operation of system 300. In general, the steps illustrated in FIG. 4 may be combined, modified, or deleted where appropriate, and additional steps may also be added to the example operation. Furthermore, the described steps may be performed in any suitable order.

Steps 400 and 410 may proceed as steps 200 and 220 in FIG. 2. Nodes within the communication session may initialize the communication session indicating that velocity-based error may be compensated. Afterwards, data may be received which may include velocity-based error. At step 420, in some embodiments, the relative velocity vector may be determined utilizing information provided by a tracking device, such as tracking device 310. The tracking device may be capable of monitoring at least velocity information concerning the nodes in the communication session and may be regularly providing this information to the nodes in the communication session. In some embodiments, tracking device 310 may also provide position information In some examples, each node may retrieve the velocity information as necessary (such as when the node receives data in the communication session that is susceptible to velocity-based errors). In various embodiments, the tracking device may transmit the velocity information to one or more of the nodes regularly based upon various factors such as: the rate of change in velocity, the amount of error introduced due to velocity, the protocol used in the communication session, the type of transmission used in the communication session, etc. At step 430, the received data may be demodulated utilizing the relative velocity determined at step 420. This may occur as described above with respect to step 240. In various embodiments, step 420 may not be performed as the relative velocity vector may not be needed as long as velocity information is otherwise available. Step 430 may occur by utilizing the velocity information as described above with respect to step 240. Further, in some embodiments, compensation for velocity-based error may occur in a transmitter, as described above with respect to step 240.

Although several embodiments have been illustrated and described in detail, it will be recognized that modifications and substitutions are possible without departing from the spirit and scope of the appended claims.

What is claimed is:

1. A method for communication, the method comprising:
receiving, by a receiver, a first pre-distorted modulated signal sent by a transmitter, the first pre-distorted modulated signal comprising Doppler error and a first transmitter velocity vector corresponding to movement of the transmitter with respect to the receiver, wherein the first pre-distorted modulated signal is pre-distorted prior to its being received at the receiver, wherein the pre-distorting comprises adjusting the first modulated signal by a first increment to compensate for a first predicted velocity based error in the first modulated signal;
receiving, by the receiver, a second pre-distorted modulated signal sent by the transmitter, the second pre-distorted modulated signal comprising Doppler error and a second transmitter velocity vector corresponding to movement of the transmitter with respect to the receiver, wherein the second pre-distorted modulated signal is pre-distorted prior to its being received at the receiver, wherein the pre-distorting comprises adjusting the second modulated signal by a second increment to compensate for a second predicted velocity based error in the second modulated signal, wherein the second increment is different than the first increment;
receiving at least one further transmitter velocity vector at a rate depending at least in part upon change of the Doppler error due to movement of the transmitter with respect to the receiver; and
if a first predetermined condition exists, compensating for at least one velocity-based error in at least one of the first and second pre-distorted modulated signals by demodulating the first and second pre-distorted modulated signals and at least the at least one further transmitter velocity vector, the demodulation comprising using at least one of the first and further transmitter velocity vectors for frequency adjustment to compensate for the Doppler error of at least one of the received first and second pre-distorted modulated signal.

2. The method of claim 1, wherein the information related to the velocity of the receiver comprises the velocity of the receiver with respect to the Earth.

3. The method of claim 1, wherein the first and farther transmitter velocity vectors are transmitted by the transmitter to a third node and then to the receiver.

4. The method of claim 1, further comprising, if the predetermined condition exists, compensating for the at least one velocity-based error in accordance with at least one threshold.

5. The method of claim 1, wherein the first predetermined condition comprises at least one of the following conditions:
(a) a relative velocity vector, computed based at least in part on at least one of the first and further transmitter velocity vectors, exceeds a first predetermined threshold;
(b) a predicted velocity vector, computed without use of the at least one of the first and further transmitter velocity vectors, exceeds a second predetermined threshold;
(c) the rate of receiving the at least one of the further transmitter velocity vectors meets the conditions of a predetermined rate threshold;
(d) the communication of at least one of the first pre-distorted modulated signal, second pre-distorted modulated signal, first transmitter velocity vector, and further transmitter velocity vector, occurs during a predetermined time;
(e) at least one of the first and second pre-distorted modulated signals is sent using a protocol susceptible to velocity-based error and, based on the velocity of at least one of the transmitter and receiver, application of compensation provides sufficient compensation for velocity-based errors so as to enable data communication using a high data rate algorithm; and (f) a node in operable communication with at least one of the receiver and the transmitter has requested that compensation for velocity based error be applied to a communication session between the receiver and the transmitter.

6. The method of claim 1, further comprising demodulating at least one of the first and second pre-distorted modulated signals without performing frequency adjustment to compensate for Doppler error, if at least one of the following second predetermined conditions exists:

(a) the predetermined first condition does not exist;
(b) the predetermined first condition no longer exists;
(c) a node in operable communication with at least one of the receiver and the transmitter has indicated mat compensation for Doppler or velocity based error does not have to be applied to a communication session between the receiver and the transmitter;
(d) the pre-distortion of the at least one of the first and second pre-distorted modulated signals is sufficient to account for at least a first predicted velocity error; and
(e) based upon a first frequency adjustment applied using at least a first received transmitter velocity vector, a second predicted velocity error for at least one of the first and second pre-distorted modulated signals indicates that a second frequency adjustment is not necessary.

7. A system for communication, the system comprising:
a first node operable to:
receive, by a receiver, a first pre-distorted modulated signal sent by a transmitter, the first pre-distorted modulated signal comprising Doppler error and a first transmitter velocity vector corresponding to movement of the transmitter with respect to the receiver, wherein the first pre-distorted modulated signal is pre-distorted prior to its being received at the receiver, wherein the pre-distorting comprises adjusting the first modulated signal by a first increment to compensate for a first predicted velocity based error in the first modulated signal;
receiving, by the receiver, a second pre-distorted modulated signal sent by the transmitter, the second pre-distorted modulated signal comprising Doppler error and a second transmitter velocity vector corresponding to movement of the transmitter with respect to the receiver, wherein the second pre-distorted modulated signal is pre-distorted prior to its being received at the receiver, wherein the pre-distorting comprises adjusting the second modulated signal by a second increment to compensate for a second predicted velocity based error in the second modulated signal, wherein the second increment is different than the first increment;
receive at least one further transmitter velocity vector at a rate depending at least in part upon change of the Doppler error due to movement of the transmitter with respect to the receiver;
determine whether a predetermined condition exists; and
if the predetermined condition exists, demodulate the first and second pre-distorted modulated signals and the at least one further transmitter velocity vector, the demodulation comprising using at least one of the first and further transmitter velocity vectors for frequency adjustment to compensate for the Doppler error of at least one of the received first and second pre-distorted modulated signal.

8. The system of claim 7, wherein the information related to the velocity of the first node comprises the velocity of the first node with respect to the Earth.

9. The system of claim 7, wherein the information related to the velocity of the first node comprises a velocity of a second node that transmits the first modulated signal to the first node.

10. The system of claim 7, wherein the information related to the velocity of the first node comprises a relative velocity vector with respect to the velocity of the first node and the velocity of a second node that transmits the first modulated signal.

11. The method of claim 7, wherein the predetermined condition comprises at least one of the following conditions:

(a) a relative velocity vector, computed based at least in part on at least one of the first and further transmitter velocity vectors, exceeds a first predetermined threshold;
(b) a predicted velocity vector, computed without use of the at least one of the first and further transmitter velocity vectors, exceeds a second predetermined threshold;
(c) the rate of receiving the at least one of the further transmitter velocity vectors meets the conditions of a predetermined rate threshold;
(d) the communication of at least one of the first pre-distorted modulated signal, second pre-distorted modulated signal, first transmitter velocity vector, and further transmitter velocity vector, occurs during a predetermined time;
(e) at least one of the first and second pre-distorted modulated signals is sent using a protocol susceptible to velocity-based error and, based on the velocity of at least one of the transmitter and receiver, application of compensation provides sufficient compensation for velocity-based errors so as to enable data communication using a high data rate algorithm; and
(f) a second node in operable communication with at least one of the receiver and the transmitter has requested that compensation for velocity based error be applied to a communication session between the receiver and the transmitter.

12. The method of claim 7, wherein the receiving of a further transmitter velocity vector is further dependent upon whether one or more of the first node and a second node mat transmits the first and second pre-distorted modulated signals to the first node has requested a transmitter velocity vector.

13. The method of claim 7, further comprising retrieving, by one or both of the first node that receives the first and second pre-distorted modulated signals and a second node that transmits the first and second pre-distorted modulated signals, at least one further transmitter velocity vector, wherein the retrieving of the further transmitter velocity vector is performed if it is determined mat at least one of the first and second pre-distorted modulated signals is susceptible to velocity-based error.

14. The method of claim 7, wherein at least a first portion of one of the first and further transmitter velocity vectors received at the receiver comprises a velocity vector from a first sensor disposed at the first node, and at least a second portion of one of the first and further transmitter velocity vectors received at the receiver comprises velocity vectors from a second sensor disposed at a second node separate from the first node, wherein the first node communicates with the second node, and where there is relative movement between the first node and the second node.

15. A method for communication, the method comprising:
generating, by a transmitter, a first pre-distorted modulated signal for transmission to a receiver, the first pre-distorted modulated signal comprising Doppler error and a first transmitter velocity vector corresponding to movement of the transmitter with respect to the receiver, wherein the first pre-distorted modulated signal is pre-distorted prior to its being received at the receiver, wherein the pre-distorting comprises adjusting the first modulated signal by a first increment to compensate for a first predicted velocity based error in the first modulated signal;

generating, by the transmitter, a second pre-distorted modulated signal, the second pre-distorted modulated signal comprising Doppler error and a second transmitter velocity vector corresponding to movement of the transmitter with respect to the receiver, wherein the second pre-distorted modulated signal is pre-distorted prior to its being received at the receiver, wherein the pre-distorting comprises adjusting the second modulated signal by a second increment to compensate for a second predicted velocity based error in the second modulated signal, wherein the second increment is different than the first increment; and generating further transmitter velocity vectors at a rate dependent at least in part upon change of the Doppler error due to movement of the transmitter with respect to the receiver;

wherein, if a predetermined condition exists, the receiver uses the first and second pre-distorted modulated signals and the further transmitter velocity vectors for frequency adjustment to compensate for the Doppler error of the received signals.

16. The method of claim 15, wherein the information related to the velocity of the transmitter comprises the velocity of the transmitter with respect to the Earth.

17. The method of claim 15, wherein the predetermined condition comprises at least one of the following conditions:
   (a) a relative velocity vector, computed based at least in part on at least one of the first and further transmitter velocity vectors, exceeds a first predetermined threshold;
   (b) a predicted velocity vector, computed without use of the at least one of the first and further transmitter velocity vectors, exceeds a second predetermined threshold;
   (c) the rate of receiving the at least one of the further transmitter velocity vectors meets the conditions of a predetermined rate threshold;
   (d) the communication of at least one of the first pre-distorted modulated signal, second pre-distorted modulated signal, first transmitter velocity vector, and further transmitter velocity vector, occurs during a predetermined time;
   (e) at least one of the first and second pre-distorted modulated signals is sent using a protocol susceptible to velocity-based error and, based on the velocity of at least one of the transmitter and receiver, application of compensation provides sufficient compensation for velocity-based errors so as to enable data communication using a high data rate algorithm; and
   (f) a node in operable communication with at least one of the receiver and the transmitter has requested that compensation for velocity based error be applied to a communication session between the receiver and the transmitter.

18. The method of claim 15, further comprising demodulating at least one of the first and second pre-distorted modulated signals without performing frequency adjustment to compensate for Doppler error, if at least one of the following second predetermined conditions exists:
   (a) the predetermined first condition does not exist;
   (b) the predetermined first condition no longer exists;
   (c) a node in operable communication with at least one of the receiver and the transmitter has indicated that compensation for Doppler or velocity based error does not have to be applied to a communication session between the receiver and the transmitter;
   (d) the pre-distortion of the at least one of the first and second pre-distorted modulated signals is sufficient to account for at least a first predicted velocity error; and
   (e) based upon a frequency adjustment applied to at least a first received transmitter velocity vector, a second predicted velocity error for the at least one of the first and second pre-distorted modulated signals indicates that frequency adjustment is not necessary.

19. A system for communication, the system comprising:
a first node operable to::
generate, by a transmitter, a first pre-distorted modulated signal for transmission to a receiver, the first pre-distorted modulated signal comprising Doppler error and a first transmitter velocity vector corresponding to movement of the transmitter with respect to the receiver, wherein the first pre-distorted modulated signal is pre-distorted prior to its being received at the receiver, wherein the pre-distorting comprises adjusting the first modulated signal by a first increment to compensate for a first predicted velocity based error in the first modulated signal;

generate, by the transmitter, a second pre-distorted modulated signal, the second pre-distorted modulated signal comprising Doppler error and a second transmitter velocity vector corresponding to movement of the transmitter with respect to the receiver, wherein the second pre-distorted modulated signal is pre-distorted prior to its being received at the receiver, wherein die pre-distorting comprises adjusting the second modulated signal by a second increment to compensate for a second predicted velocity based error in the second modulated signal wherein the second increment is different than the first increment; and generate further transmitter velocity vectors at a rate dependent at least in part upon change of the Doppler error due to movement of the transmitter with respect to the receiver;

wherein, if a predetermined condition exists, the first and second pre-distorted modulated signals and the further transmitter velocity vectors are configured to enable the receiver to use the transmitter-velocity vectors-for frequency adjustment to compensate for the Doppler error of the received signals.

20. The system of claim 19, wherein the information related to the velocity of the transmitter comprises the velocity of the transmitter with respect to the Earth.

21. The system of claim 19, wherein the predetermined condition comprises at least one of the following conditions:
   (a) a relative velocity vector, computed based at least in part on at least one of the first and further transmitter velocity vectors, exceeds a first predetermined threshold;
   (b) a predicted velocity vector, computed without use of the at least one of the first and further transmitter velocity vectors, exceeds a second predetermined threshold;
   (c) the rate of receiving the at least one of the further transmitter velocity vectors meets the conditions of a predetermined rate threshold;
   (d) the communication of at least one of the first pre-distorted modulated signal, second pre-distorted modulated signal, first transmitter velocity vector, and further transmitter velocity vector, occurs during a predetermined time;

(e) at least one of the first and second pre-distorted modulated signals is sent using a protocol susceptible to velocity-based error and, based on the velocity of at least one of the transmitter and receiver, application of compensation provides sufficient compensation for velocity-based errors so as to enable data communication using a high data rate algorithm; and (f) a second node in operable communication with at least one of the receiver and the transmitter has requested that compensation for velocity based error be applied to a communication session between the receiver and the transmitter.

22. The system of claim 19, wherein the first node is former configured to generate further transmitter velocity vectors dependent whether one or more of the first node and a second node that receives the first and second pre-distorted modulated signals from the first node, has requested a transmitter velocity vector.

23. The system of claim 19, wherein the first node is further configured to generate at least one further transmitter velocity vector, if it is determined, by either the first node or a second node that receives the first and second pre-distorted modulated signals, that at least one of the first and second pre-distorted modulated signals is susceptible to velocity-based error.

24. The method of claim 19, wherein at least a first portion of one of the first and further transmitter velocity vectors generated by the transmitter comprises a velocity vector from a first sensor disposed at the first node, and at least a second portion of one of the first and further transmitter velocity vectors sent to the receiver comprises velocity vectors from a second sensor disposed at a second node separate from the first node, wherein the first node communicates with the second node, and where there is relative movement between the first node and the second node.

\* \* \* \* \*